Sept. 13, 1955 L. W. EWING 2,717,562
HOLDER FOR CORRUGATED ROOF
Filed Feb. 29, 1952
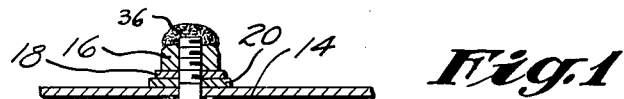
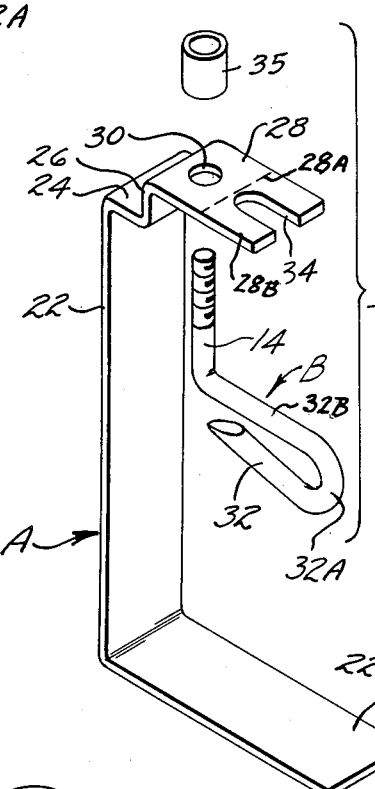
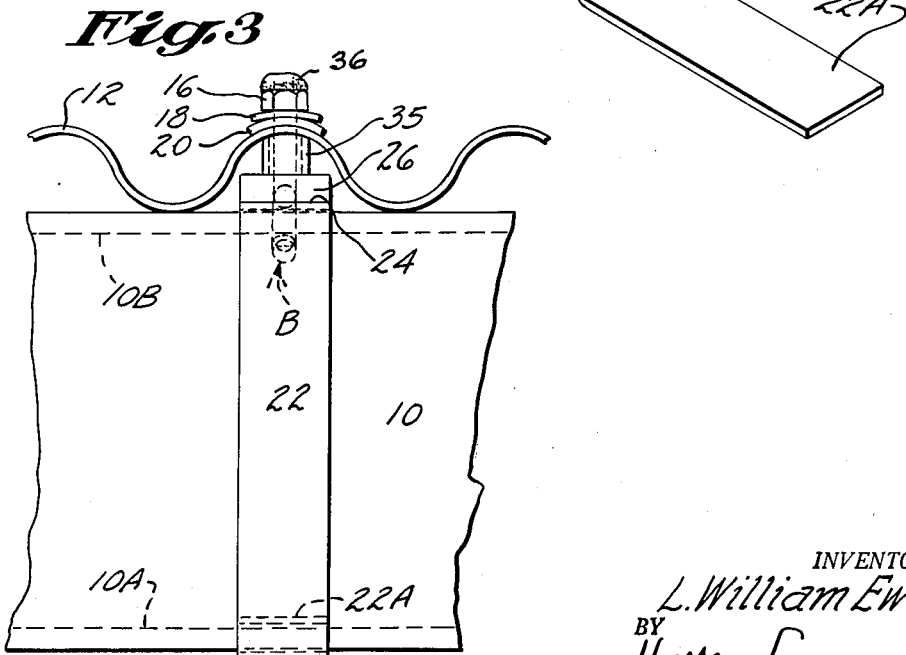
INVENTOR.
L. William Ewing
BY Harry Langsam
Attorney

United States Patent Office 2,717,562
Patented Sept. 13, 1955

2,717,562

HOLDER FOR CORRUGATED ROOF

Lawrence William Ewing, Philadelphia, Pa.

Application February 29, 1952, Serial No. 274,265

2 Claims. (Cl. 108—33)

My invention relates to a fastener and relates particularly to a fastener for corrugated sheets or shingles and the like.

Heretofore, fasteners for securing marginal overlap operations of roofing units and sidings have been used, and in the case where the roof comprises a supporting substructure with corrugated sheets overlapping at their side portions to a frame a lap joint, bolts have been used to fasten the overlapping corrugated joints together. The holding bolts for the corrugated roof overlaps extend through holes in the corrugated roof so that the head of the bolt is on the outside and the threaded end of the bolt must be aligned with a suitable holding nut which is usually attached to the supporting substructure which has a channel iron or an I-beam.

Experience has shown that a great deal of time is consumed because the hole in the corrugation is not exactly aligned with the nut which receives the holding bolt.

Furthermore, scaffolding has been required and drilling of the holes through the corrugated metal or corrugated asbestos roofing and siding has been required.

It is an object of my invention to produce a fastener for corrugated sheets which may be rapidly attached to any size or shape of steel framing, and wherein the corrugated sheet may be properly aligned upon the locking bolt.

Another object of my invention is to provide a fastener for corrugated roofing wherein the fastener may be attached to any type of steel frame and wherein the corrugated sheet will be properly aligned with the holding bolts, and wherein the holding nut will be made waterproof.

Another object of my invention is to provide a fastener for a corrugated asbestos roofing and siding wherein all of the work may be performed from the outside of the siding or the roof whereby no inside scaffolding is required.

Another object of my invention is to provide a fastener for a corrugated roof wherein the fastener is inserted in place upon the frame from the top without use of scaffolding and then the corrugated roofing is struck with a hammer to punch the roofing in position upon the fastener.

Other objects of my invention are to provide an improved device of the character described, that is easily and economically produced, which is sturdy in construction, and which is highly effective in operation.

With the above and related objects in view, my invention consists in the details of construction and combination of parts, as will be more fully understood from the following description, when read in conjunction with the accompanying drawing, in which:

Fig. 1 is a fragmentary sectional view of the corrugated sheet held to a steel framing by a locking bolt and locking cleat embodying my invention.

Fig. 2 is a perspective view of the locking cleat, locking bolt, and spacer.

Fig. 3 is a front view of the device of my invention shown in Fig. 1.

Referring now in greater detail to the drawing wherein similar reference characters refer to similar parts, I show a steel framing 10 which is a channel iron. However, an I-beam or other suitable steel framing may be used.

A corrugated sheet 12 is adapted to be fastened to the steel framing and I achieve this by utilizing a locking cleat generally designated as A, which is adapted to grasp the steel framing.

Coupled and attached to the locking cleat A is a locking bolt, generally designated as B, which has a threaded portion 14 projecting upwardly or outwardly from the steel framing 10.

The locking bolt B has its threaded end 14 pass through an opening in the corrugation in order to receive suitable holding means such as a nut 16, a steel washer 18, and a lead washer 20. The lead washer serves to waterproof the connection of the nut to the bolt while the steel washer adds strength.

The locking cleat A comprises an elongated portion 22 wherein its end 22A may be bent to grasp a leg 10A of the steel framing. A flange 24, at right angles to the main portion 22 is adapted to rest upon one corner of the second leg 10B of the steel framing. An offset 26, at one end of the flange 24 spaces the end 28 from the outer surface of the steel framing structure 10B. An opening 30 in the end 28 of the locking cleat A has a portion of the locking bolt B inserted therein.

The locking bolt B has one end 32 of general U-shaped configuration which is adapted to abut and frictionally engage both sides of the steel framing leg 10B; and the threaded end 14 of the locking bolt B extends above the end 28 of the locking cleat A.

At this point it should be noted that the locking cleat grasps one leg 10A of the steel framing, and the other leg 10B is grasped by a locking bolt, the locking cleat and the locking bolt being joined together by virtue of the locking bolt passing through an opening in the locking cleat.

The end of the portion 28 has a recess 34 therein which is adapted to straddle a portion of the locking bolt, thereby keeping the locking cleat A aligned with the locking bolt B since there is a two point connection between the locking cleat and the locking bolt one connection being the telescoping of the bolt end 14 through the opening 30 in the locking cleat, and the other point being recessed portion 34 straddling the bolt portion 32B.

The end 28 is bent along the line 28A so that the portion 28B extends vertically.

In operation my invention is applied as follows: The structural framing is completed and the graded roof and the corrugated siding is about to be placed in position. No inside scaffolding is required. The roofer spaces the locking bolts and the locking cleats at intervals by placing them in position so that the threaded end 14 of the locking bolt extends away from the framing. The locking bolt B is fastened in position by hitting the closed end 32A with a hammer so that the U-shaped portion frictionally engages the leg 10B of the channel iron B. A spacer 35 is inserted over the bolt end 14. The corrugated sheets are laid in position and wherever the sheets overlap the threaded bolt portion 4, the roofer strikes the corrugated sheet with a hammer adjacent the bolt so that the bolt end 14 pierces the corrugated sheet. After the roof is laid in position the roofer places through the threaded bolt a lead washer 20 which, when squeezed in position seals any opening between the corrugated sheets and the bolt. A steel washer 18 is placed over the lead washer and then the nut 16 is tightened in position, and over the nut 16 may be placed asbestos putty 36 or any other water sealing compound.

With my invention corrugated metal or corrugated asbestos roofings and sidings may be held in position. The labor saved by using my invention is considerable since all of the work can be done from the outside of the roof or the outside of the siding, and no inside scaffolding is required, which was the case in the prior art.

With my invention no drilling of the steel structure is required at any time.

Although my invention has been described in considerable detail, such description is intended as being illustrative rather than limiting, since the invention may be variously embodied, and the scope of the invention is to be determined as claimed.

I claim as my invention:

1. A roof including a supporting substructure comprising spaced parallel beams having upper and lower flanges, sheets of corrugated metal roofing material placed thereabove and bridging at least two of said beams, adjacent sheets overlapping one another, means securing the sheets of roofing material to said beams, said securing means including a bolt projecting outwardly through said sheets and having a U-shaped lower end engaging an upper flange of said beams, a U-shaped cleat member having a lower bent end grasping the lower flange of one of the beams, said bolt projecting through an opening in the other end of said U-shaped member, and a spacer on said bolt to space the roof from said cleat.

2. In combination, a beam having upper and lower flanges and a roofing clamp comprising a U-shaped cleat having a lower bent end grasping the lower flange of said beam, a locking bolt having a U-shaped lower end engaging an upper flange of said beam, the upper end of said locking bolt projecting through an opening in the upper end of said U-shaped cleat and having a spacer, sealing washer and nut mounted thereon.

References Cited in the file of this patent

UNITED STATES PATENTS

| | | |
|---|---|---|
| 1,646,285 | Frey | Oct. 18, 1927 |
| 2,014,451 | Pfeifer | Sept. 17, 1935 |
| 2,604,194 | Hammitt | July 22, 1952 |

FOREIGN PATENTS

| | | |
|---|---|---|
| 733,515 | France | of 1933 |